United States Patent
Jeong et al.

(10) Patent No.: US 9,807,634 B2
(45) Date of Patent: Oct. 31, 2017

(54) MOBILE COMMUNICATION SYSTEM, AND CARRIER MEASUREMENT METHOD IN THE MOBILE COMMUNICATION SYSTEM

(75) Inventors: Kyeong In Jeong, Hwaseong-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 522 days.

(21) Appl. No.: 13/638,336

(22) PCT Filed: Mar. 29, 2011

(86) PCT No.: PCT/KR2011/002137
§ 371 (c)(1),
(2), (4) Date: Sep. 28, 2012

(87) PCT Pub. No.: WO2011/122823
PCT Pub. Date: Oct. 6, 2011

(65) Prior Publication Data
US 2013/0016690 A1    Jan. 17, 2013

(30) Foreign Application Priority Data
Mar. 29, 2010   (KR) .................. 10-2010-0028164

(51) Int. Cl.
*H04W 24/10* (2009.01)
*H04L 5/00* (2006.01)

(52) U.S. Cl.
CPC ............ *H04W 24/10* (2013.01); *H04L 5/001* (2013.01)

(58) Field of Classification Search
CPC .............................. H04L 5/001; H04W 24/10
See application file for complete search history.

(56) References Cited

U.S. PATENT DOCUMENTS

| | | | | |
|---|---|---|---|---|
| 2008/0069062 A1* | 3/2008 | Li | .................. | H04W 52/265 370/338 |
| 2009/0270103 A1* | 10/2009 | Pani et al. | .................. | 455/436 |
| 2011/0038271 A1* | 2/2011 | Shin et al. | .................. | 370/252 |
| 2012/0182948 A1* | 7/2012 | Huang | .................. | H04L 5/001 370/329 |

OTHER PUBLICATIONS

Qualcomm Incorporated, "HS-SCCH Orders for Activation and De-Activation of secondary carriers in 4C-HSDPA", 3GPP TSG RAN WG1 #59bis, R1-100281, Jan. 18-22, 2009, Valencia, Spain.
ZTE, "HS-SCCH Order Design for Secondary Carrier (De-) Activation in 4C-HSDPA", 3GPP TSG RAN WG1 #59bis, R1-100725, Jan. 18-22, 2009, Valencia, Spain.
(Continued)

*Primary Examiner* — Walter DiVito
(74) *Attorney, Agent, or Firm* — Jefferson IP Law, LLP

(57) ABSTRACT

The present invention defines a method for a terminal capable of aggregating multiple carriers to perform measurement to the carriers efficiently in a mobile communication system. The present invention is directed to the 3GPP LTE (Long Term Evolution or 3GPP LTE-A (LTE-Advanced) system that is currently discussed in the 3GPP (3$^{rd}$ Generation Partnership Project) as an example of the communication system to which the present invention is applied.

8 Claims, 10 Drawing Sheets

(56) References Cited

OTHER PUBLICATIONS

Huawei, "Flexible HS-DPCCH Design for 4-carrier HSDPA", 3GPP TSG RAN WG1 #59bis, R1-100150, Jan. 18-22, 2009, Valencia, Spain.
Interdigital Communications LLC., "On Carrier Activation/Deactivation for 4C-HSDPA", 3GPP TSG RAN WG1 #59bis, R1-100472, Jan. 18-22, 2009, Valencia, Spain.
NTT Docomo, "Measurement gap control in CA", 3GPP TSG-RAN WG2 Meeting #69, R2-101547, Feb. 22-26, 2010, pp. 1-3, San Francisco, USA.
Nokia et al.; E-UTRA Changes for 25.133; 3GPP TSG-RAN WG4 Meeting #52; R4-093308; Aug. 24-28, 2009; Shenzhen, China.

* cited by examiner

MOBILE COMMUNICATION SYSTEM, AND CARRIER MEASUREMENT METHOD IN THE MOBILE COMMUNICATION SYSTEM

BACKGROUND OF THE INVENTION

Field of the Invention

The present invention relates to a mobile communication system and carrier measurement method thereof and, in particular, to a mobile communication system including base stations and terminals and a method for terminal capable of carrier aggregation to manage carriers using the information included in the UE-specific message received from the base station in the system.

Description of the Related Art

Mobile communication systems have developed to provide the subscribers with voice communication services on the move. With the advance of technologies, the mobile communications have been evolved to support high speed data communication services as well as the standard voice communication services. Recently, as one of the next generation mobile communication system, Long Term Evolution (LTE) is on the standardization by the 3$^{rd}$ Generation Partnership Project (3GPP). LTE is a technology designed to provide high speed packet-based communication of up to 100 Mbps and standardized almost completely now with the aim at commercial deployment around 2010 timeframe. Meanwhile, unlike the voice service, the resource to be allocated for data service is determined according to the data amount to be transmitted and the channel condition. Accordingly, in the wireless communication system such as mobile communication system, a scheduler allocates the transmission resource in consideration of the resource amount for transmission, channel condition, and data amount. This is also the case in the LTE as one of next generation mobile communication systems, and the scheduler located at the base station manages and allocates radio transmission resource.

Recently, the discussions are focused on the LTE-Advanced (LTE-A) for increasing data rate with the integration of novel technologies into the LTE system. One of the representative novel technologies is Carrier Aggregation (CA). CA is a technique to aggregate multiple uplink or downlink carriers. With the CA technique, it is possible to increase the data rate a capacity of the terminal by allocating resources on multiple carriers.

FIG. 1 is a diagram illustrating the architecture of an legacy LTE or LTE-A system.

Referring to FIG. 1, the radio access network of an LTE/LTE-A system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130. The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B.

In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells.

In order to secure the data rate of up to 100 Mbps, the LTE system adopts Orthogonal Frequency Division Multiplexing (OFDM) as a radio access technology on up to 20 MHz bandwidth. Also, the LTE system adopts Adaptive Modulation and Coding (AMC) to determine the modulation scheme and channel coding rate in adaptation to the channel condition of the UE.

The S-GW 130 is an entity to provide data bearers so as to establish and release data bearers under the control of the MME 125. MME 125 is responsible for various control functions and connected to a plurality of eNBs 105, 110, 115, and 120.

FIG. 2 is a diagram illustrating a carriers aggregated for a UE according to the conventional technology.

Referring to FIG. 2, an eNB performs transmission and reception on multiple carriers of different bands in general. For example, suppose the downlink carrier_1 201 having center frequency F1 and bandwidth of BW1, the downlink carrier_2 203 having center frequency F2 and bandwidth of BW2, and the downlink carrier_3 205 having center frequency F3 and bandwidth of BW3. In this case, unlike the conventional UE capable of receiving data on only one carrier, the UE capable of carrier aggregation can receive data on multiple carriers simultaneously.

This means that, in FIG. 2, the UE is capable of receiving data on the downlink carrier_1 201, downlink carrier_2 203, and downlink carrier_3 205 simultaneously. Likewise, the conventional UE is capable of transmitting data on only one carrier. However, the UE capable of carrier aggregation can transmit data on the uplink carrier_1 211, uplink carrier_2 213, and uplink carrier_3 215 simultaneously.

Accordingly, the eNB is capable of allocating more carriers to the UE capable of carrier aggregation according to conditions so as to increase downlink/uplink transmission capacity/data rate of the UE. Assuming that a cell consists of one downlink carrier and one uplink carrier and one uplink carrier in the conventional concept, the carrier aggregation can be understood as if the UE transmits/receives data through multiple cells simultaneously. With the use of carrier aggregation, the peak data rate expected in a cell increases in proportion to the number of aggregated carriers.

FIG. 3 is a diagram illustrating a measurement method of the conventional UE capable of carrier aggregation.

Referring to FIG. 3, the downlink carrier_1 301 having center frequency F1 and bandwidth of BW1, the downlink carrier_2 303 having center frequency F2 and bandwidth of BW2, and the downlink carrier_3 305 having center frequency F3 and bandwidth of BW3 are configured to be aggregated by the eNB. It is assumed that, among the configured carriers, the downlink carrier_1 301 and the downlink carrier_2 303 are activated carriers and the downlink carrier_3 305 is deactivated carrier. The carrier aggregation configuration is for the eNB to configure the candidate carriers available for carrier aggregation based on the UE capability information and notify the UE of the configuration. The activation/deactivation of configured carriers is to select the carriers to be used for data transmission/reception among the candidate carriers and activate the selected carriers or to select the carriers not to be used for data transmission/reception and deactivate the selected carriers.

For example, the carrier activation can operate in such a way that, when downlink or uplink data occurs actually, the eNB selects the carriers to be used for data transmission/reception among the configured aggregation candidate carriers based on the size of data to be transmitted, radio channel condition, load state of the cell, etc. and notifies the UE of the selected carriers. The carrier deactivation also can operate in the same principle as above.

In FIG. 3, if the downlink carrier_1 301 and the downlink carrier_2 303 are activated, the UE regards that the Radio Frequency (RF) chain_A 311 and RF chain_B 313 operate; and if the downlink carrier_3 305 is activated, the UE regards that the RF chain_C 315 operates. Since the downlink carrier_1 301 and the downlink carrier_2 303 are activated to receive data, the UE maintains the activation of the RF chain_A 311 and RF chain_B 313 for channel measurement on the downlink channel and receiving scheduling information. This means that the UE is capable of performing measurement on the downlink carrier_1 301 and downlink carrier_2 303 without UE's extra power waste.

DISCLOSURE OF INVENTION

Technical Problem

Meanwhile, although it is the aggregation candidate carrier, the downlink carrier_3 305 is not activated for data transmission. Accordingly, the UE has to operate the RF chain_C 315 only for the purpose of measurement on the downlink carrier_3 305, resulting in UE's power waste.

In other words, the UE has to operate the RF chain_C 315 for the downlink carrier_3 305 regardless of data transmission and thus wastes power unnecessarily.

There is therefore an efficient carrier measurement method for reducing power waste caused by measurement.

Solution to Problem

In order to solve the above problem, the carrier measurement method of the present invention includes receiving priority information transmitted by a base station for measurement per downlink carrier; and performing measurement to the downlink carrier according to the received priority information.

Also, in the carrier measurement method of the present invention, performing includes determining a case state according to whether a primary downlink carrier and other downlink carriers exist; selecting RF chain for use in reception on the downlink carrier to which a measurement gap pattern is applied according to the case state; and performing the measurement to the corresponding downlink carrier by applying the measurement gap pattern to the selected RF chain.

Also, in the carrier measurement method of the present invention, determining includes determining the case state based on activated/deactivated states of the primary downlink carrier and other downlink carriers and presence or not of downlink carriers configured for inter-frequency or inter-system measurement.

Also, in the carrier measurement method of the present invention, selecting comprises selecting at least one of the RF chain for use in reception on the primary downlink carrier and the RF chains for use in reception on downlink carriers according to a measurement application priority.

Also, in the carrier measurement method of the present invention, performing the measurement to the downlink carrier comprises performing the measurement to the corresponding downlink carrier during a gap duration calculated according to the measurement gap pattern applied to the corresponding downlink chains.

Also, in order to solve the above problem, a carrier measurement terminal of the present invention includes a radio transceiver which is responsible for radio communication with a base station and configuring plural RF chains; a control message generator/analyzer which receives carrier aggregation candidate configuration information, measurement gap pattern information, measurement application priority information per RF chain or downlink carrier to which the measurement gap pattern is to be applied, activation/deactivation command for specific candidate downlink carriers, and inter-frequency or inter-system measurement configuration information; and a measurement unit which performs measurement to the downlink carriers based on the measurement gap pattern information and per-downlink carrier measurement application priority information.

Also, in the carrier measurement terminal of the present invention, the measurement unit determines a case state according to whether a primary downlink carrier and other downlink carriers exist, selects RF chain for use in reception on the downlink carrier to which a measurement gap pattern is applied according to the case state, and performs the measurement to the corresponding downlink carrier by applying the measurement gap pattern to the selected RF chain.

Also, in the carrier measurement terminal of the present invention, the measurement unit determines the case state based on activated/deactivated states of the primary downlink carrier and other downlink carriers and presence or not of downlink carriers configured for inter-frequency or inter-system measurement.

Also, in the carrier measurement terminal of the present invention, the measurement unit selects at least one of the RF chain for use in reception on the primary downlink carrier and the RF chains for use in reception on downlink carriers according to a measurement application priority.

Still, in the carrier measurement terminal of the present invention, the measurement unit performs the measurement to the corresponding downlink carriers during a gap duration calculated according to the measurement gap pattern applied to the corresponding downlink chains.

Advantageous Effects

According to the present invention, the UE capable of aggregating multiple downlink carriers is capable of performing measurement efficiently using the UE-specific message received from the eNB. That is, the eNB checks the UE capable of carrier aggregation, determines the priority of a downlink carrier, and notifies the UE of the priority of the downlink carrier, such that the UE is capable of performing measurement efficiently only on the corresponding downlink carrier using a measurement gap pattern.

DETAILED DESCRIPTION OF EXEMPLARY EMBODIMENTS

Figure 1:
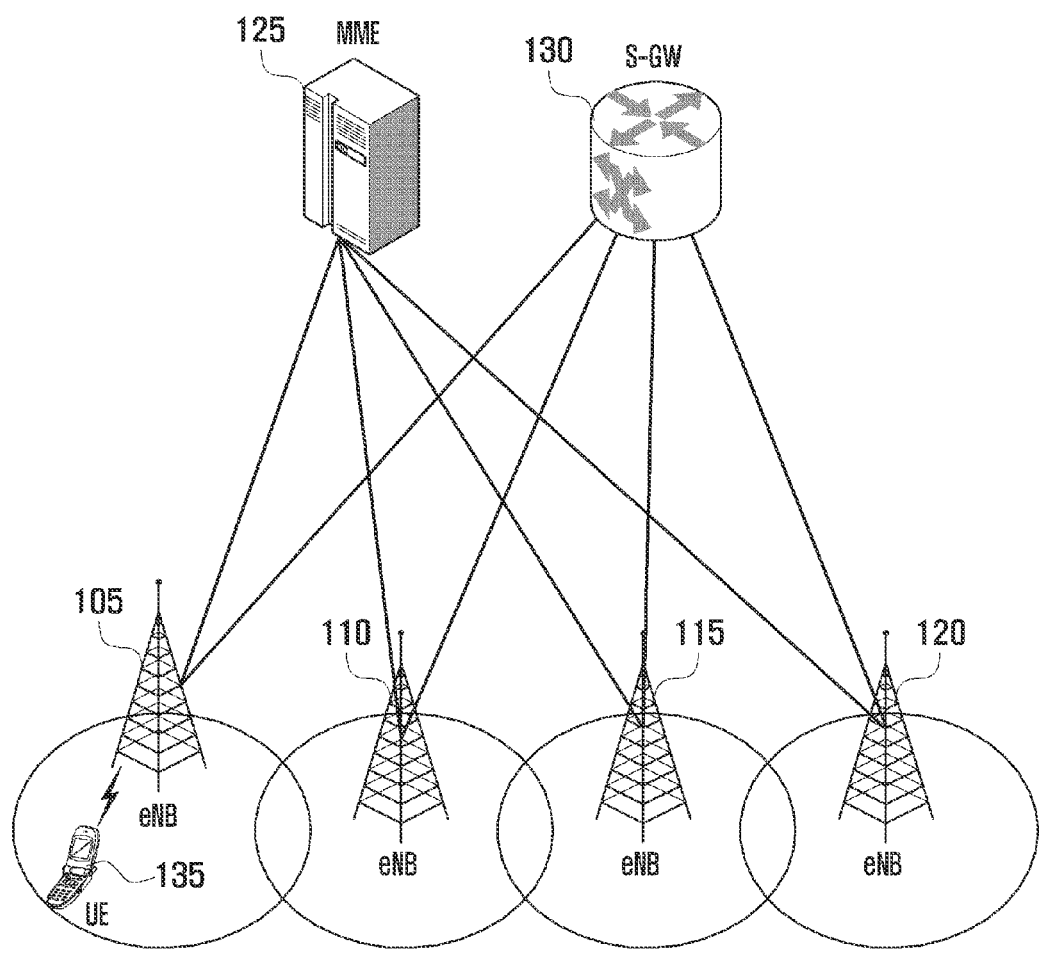
FIG. 1 is a diagram illustrating the architecture of a legacy LTE or LTE-A system.
Figure 2:
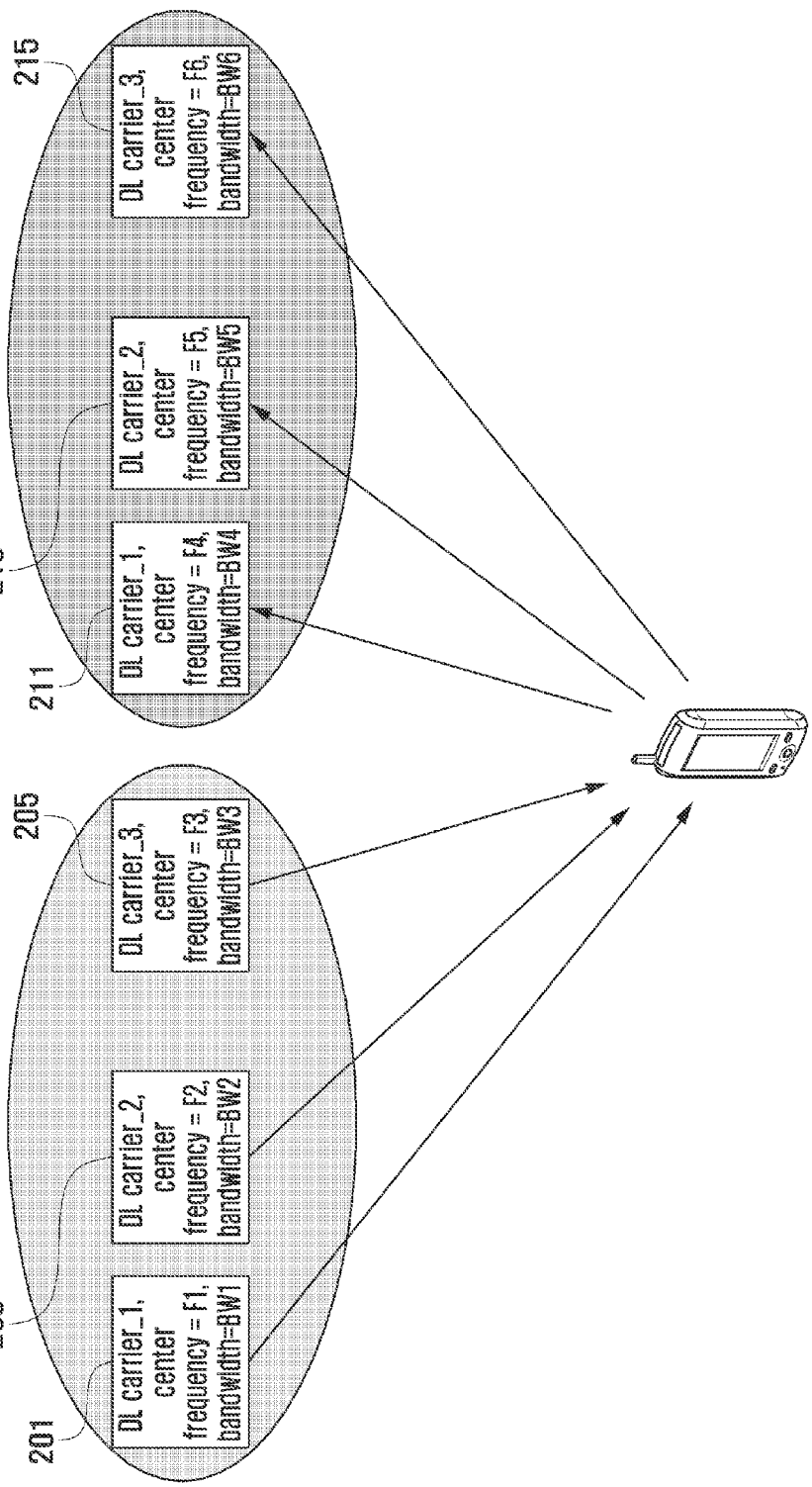
FIG. 2 is a diagram illustrating a carriers aggregated for a UE according to the conventional technology.
Figure 3:
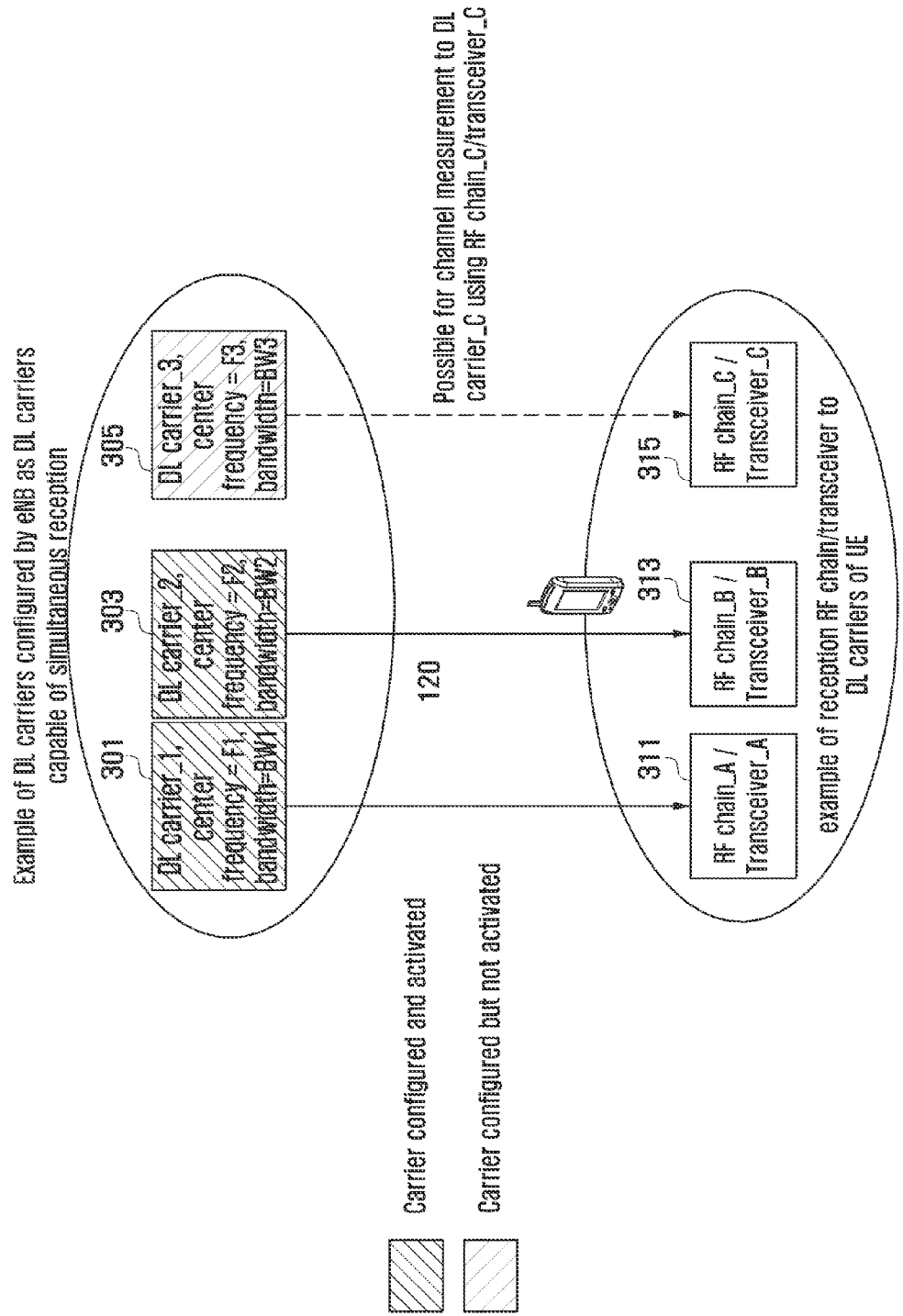
FIG. 3 is a diagram illustrating a measurement method of the conventional UE capable of carrier aggregation.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The terms and words used in this description and the appended claims are not to be interpreted in common or lexical meaning but, based on the principle that an inventor can adequately define the meanings of terms to best describe the invention, to be interpreted in the meaning and concept conforming to the technical concept of the present invention.

The present invention proposes an efficient measurement method of a UE capable of aggregating multiple downlink carriers. For this purpose, an eNB configures candidate carriers for use in carrier aggregation to the UE capable of aggregating multiple downlink carriers. The eNB sends the UE the candidate carrier information (including the information on a primary downlink carrier and secondary downlink carriers), per-carrier RF chain information, and measurement application priority information per RF chain to which measurement gap pattern information and measurement gap pattern or measurement application priority information per downlink carrier. Here, the measurement means a procedure for measuring the strength of pilot signals of adjacent eNBs to support UE mobility and manage component carriers for carrier aggregation. The measurement gap means the gap during which the communication with the serving eNB is suspended temporarily. During the measurement gap, the UE measures the strength of the pilot signals of the adjacent eNB.

The Primary Component Carrier (PCC) can be a security input reference for transmission data ciphering and integrity check. The PCC also can be a reference carrier for determining mobility of the UE. The PCC also can be the basic carrier for UE-specific control information transmission as well as downlink and uplink data transmission. The PCC also can be the reference carrier for determining radio link failure. Particularly, the PCC can be a specific carrier among the configured aggregation candidate carriers. The other aggregation candidate carriers (Secondary Component Carrier (SCC)) are mainly used for data transmission.

If only the PCC is in the activated state, and the SCCs are in the deactivated state, the UE which has received the information performs measurement to the deactivated downlink carriers and the downlink carriers configured with inter-frequency or inter-Radio Access Technology (RAT) measurement that are not configured as aggregation candidate carriers. At this time, the UE selects the Radio Frequency (RF) chain receiving the corresponding downlink carrier and highest (lowest) measurement application priority and performs measurement thereon.

i) RF chain for use in reception on PCC ii) RF chain having the highest (lowest) measurement gap application priority received at aggregated carrier configuration step among the SCCs or RF chain for use in reception on the carrier having the highest (lowest) measurement gap application priority when the measurement is performed along with data communication At this time, the measurement gap pattern received at the aggregated carrier configuration step is applied to i) among the RF chains selected as above, and thus the RF chain for use in reception on the PCC can be measured on the corresponding carrier during the gap calculated in the time domain. Also, the measurement gap pattern is applied to both the i) and ii) and thus the corresponding RF chains can be measured on the corresponding downlink carrier during the gap calculated in the time domain in adaptation to the timing of the PCC.

In addition to the above embodiment, the RF chain for measurement to the downlink carrier can be selected in the course to minimize the total number of RF chains necessary for measurement to the deactivated downlink carriers and the downlink carriers not configured as aggregation candidate carriers but configured for inter-frequency or inter-RAT measurement.

For example, it is assumed that the downlink carrier and the RF chain for use in reception on the downlink carrier are as follows. First, there are the RF chain_1 for receiving on the PCC_A and RF chain_2, RF chain_3, and RF chain_4 for reception on the deactivated downlink carriers B, C, and D. The measurement application priority is in the order of RF chain_2, RF chain_3, and RF chain_4; and the RF chain_1 can be used for reception/measurement on the downlink carrier_A and downlink carrier_B. Also, the RF chain_2 can be sued for reception/measurement on the downlink carrier_B and downlink carrier_C. The RF chain_3 can be used for reception/measurement on the downlink carrier_C. Also, the RF chain_4 can be sued for reception/measurement on the downlink carrier_B, downlink carrier_C, and downlink carrier_D.

According to the rule i) and ii), the measurement to the downlink carrier_A and downlink carrier_B are performed on the RF chain_1. Also, the measurement to the downlink carrier_C is performed on the RF chain_2. Next, the measurement to the downlink carrier_D is performed on the RF chain_4. In this case, total number of required RFs is 3 which is disadvantageous for power saving of the UE. Accordingly, the UE is capable of RF chain selection so as to perform measurement to the downlink carrier_A and downlink carrier_B on the RF chain_1 and to the downlink carrier_C and downlink carrier_D on the RF chain_4. In this case, the number of RFs required for measurement is 2. In this embodiment, it is possible to use along with the priorities of i) and ii). That is, the priorities of i) and ii) for each downlink carrier can be maintain as far as the same number of RFs is required.

In the above embodiments, in order to reduce data transmission interference on the activated PCC, the PCC or measurement gap pattern is not applied to the RF chain for use in receipt on the PCC. The measurement is performed only on the measurement-capable deactivated downlink carrier or the downlink carrier not configured as aggregation candidate carrier but configured for inter-frequency or inter-RAT measurement (e.g. PCC and consecutive downlink carrier in the same band).

The measurement to the deactivated downlink carriers or the downlink carriers not configured as aggregation candidate carrier but configured inter-frequency or inter-RAT measurement is performed on any of RF chains that are not the RF chain for use in reception on the PCC. That is, the carrier to be measured of i) can be restricted to the PCC, the deactivated downlink carrier available for measurement without application of the measurement gap, and the downlink carriers not configured as aggregation candidate carrier but configure for inter-frequency or inter-RAT measurement. At this time, the measurement gap pattern received at aggregation candidate carrier configuration step may not be applied to both i) and ii) or may be applied to only ii).

After receiving the carrier aggregation configuration information at the aggregation candidate carrier configuration step, if the PCC and at least one aggregation candidate downlink carrier are activated and if a deactivated downlink carrier or a downlink carrier which is not configured as aggregation candidate carrier but configured for inter-frequency or inter-RAT measurement exists, the UE performs measurement to the deactivated downlink carrier or the downlink carrier which is not configured as aggregation candidate carrier but configured for inter-frequency or inter-RAT measurement. The UE activate selects the RF chain capable of reception/measurement on the corresponding downlink carrier and having the highest priority among the RF chains having the following priorities and performs measurement.

i) RF chain for use in reception on PCC ii) RF chain having the highest (lowest) priority for applying the measurement gap received at the aggregation candidate carrier configuration step or the RF chain for use in reception on the downlink carrier having the highest (lowest) measurement application priority in measurement along with data transmission among the SCCs with the exception of PCC iii) RF chain having the highest (lowest) priority for applying measurement gap pattern received at the aggregation candidate carrier configuration step or RF chain for use in reception on the downlink carrier having the highest (lowest) measurement application priority when the measurement is performed along with the data transmission/reception among the RF chains excluding i) and ii)

At this time, the measurement gap pattern received at the aggregation candidate carrier configuration step can be applied to all of i), ii), and iii) or only i) and ii) among the RF chains selected above. The RF chain corresponding to the downlink carrier to which the measurement gap is applied is capable of measurement to the corresponding downlink carrier during the gap calculated in the time domain.

In addition to the above embodiments, the UE is capable of selecting the RF chain for performing measurement to the downlink in the course of minimizing the number of RF chains required additionally for the measurement to the current PCC, the deactivated downlink carriers, and the downlink carriers that are not configured as aggregation candidate carrier but configured for inter-frequency or inter-RAT measurement in addition to the number of the RF chains for use in the activated downlink carrier. Since the similar example has been described, detailed description thereon is omitted herein. This embodiment can be utilized along with the priorities of i), ii), and iii). That is, the priorities of i), ii), and iii) for the respective downlink carriers are maintain as far as the same number of additional RFs are required.

Also, the UE is capable of selecting the RF chain for performing measurement to the downlink carrier in the course of minimizing the number of RF chains for use in measurement to the deactivated downlink carriers and the downlink carriers that are not configured as aggregation candidate carrier but configured for inter-frequency or inter-RAT measurement among the RF chains for use in receiving on the PCC and the other activated downlink carriers. For example, it is assumed that the downlink carriers and the RF chains for use in receiving on the downlink carrier are as follows. There are RF chain_1 for reception on the primary downlink carrier_A, RF chain_2 and RF chain_3 for reception on the activated downlink carrier_B and downlink carrier_C, RF chain_4 and RF chain_5 for reception on deactivated downlink carrier_B and downlink carrier_C, and downlink carrier_F and downlink carrier_G that are not configured as aggregation candidate carrier but configured for inter-frequency or inter-RAT measurement. The measurement application priorities are configured in the order of RF chain_2, RF chain_3, RF chain_4, and RF chain_5. The RF chain_1 can be used in reception/management to the downlink carrier_A, downlink carrier_B, and downlink carrier_D. Also, the RF chain_2 can be used in reception/measurement to the downlink carrier_B, downlink carrier_E, and downlink carrier_F. Also, the RF chain_3 can be used in reception/measurement to the downlink carrier_C, downlink carrier_D, downlink carrier_E, downlink carrier_F, and downlink carrier_G. Also, the RF chain_4 can be used in reception/measurement to the downlink carrier_D. Finally, it is assumed that the RF chain_5 can be used in reception/measurement to the downlink carrier_D and downlink carrier_E.

According to the rules of i), ii), and iii), the measurement to the deactivated downlink carrier_D is performed on the RF chain_1. The measurement to the deactivated downlink carrier_E and the downlink carrier_F which is configured for inter-frequency or inter-RAT measurement is performed on the RF chain_2. The measurement to the downlink carrier_G which is configured for inter-frequency or inter-RAT measurement is performed on the RF chain_3. In this case, the measurement gap pattern received at the aggregation candidate carrier configuration step has to be applied to all of the RF chain_1, RF chain_2, and RF chain_3 that are currently activated, resulting in high interference probability in data communication.

Thus, the measurement RF can be selected such that the measurement can be performed all to the deactivated downlink carrier_D in RF chain_3, deactivated downlink carrier_E, and downlink carrier_F and downlink carrier_G that are configured for inter-frequency or inter-RAT measurement. Accordingly, the measurement gap pattern received at the aggregation candidate carrier configuration step can be applied to only the RF chain_3. That is, the priorities of i), ii), and ii) to the respective downlink carriers can be maintain as far as the same number of activated RFs are required.

In the above embodiments, the measurement is performed to the primary downlink carrier or the downlink carrier available for measurement without application of the measurement gap pattern on the RF chain for receiving the primary downlink carrier or the downlink carriers that are not configured as aggregation candidate carrier but configured for inter-frequency or inter-RAT measurement (e.g. PCC and consecutive downlink carriers on the same band).

Next, the measurement to the deactivated downlink carriers and the downlink carriers that are not configured as aggregation candidate carrier but configured for inter-frequency or inter-RAT measurement can be performed only on the RF chains with the exception of the RF chain for use in reception on the PCC. At this time, the measurement target carriers of i) are limited to the PCC, deactivated downlink carriers available for measurement without application of the measurement gap pattern (without interference to application of gap in reception on the PCC), downlink carriers that are not configured as aggregation candidate carrier but configured for inter-frequency or inter-RAT measurement. The measurement gap pattern received at the aggregation candidate carrier configuration step may not be applied to i). After receiving the carrier aggregation configuration information at the aggregation candidate carrier configuration step, if the PCC and all other aggregation candidate carriers are activated and if there is no downlink carrier which is not configured as aggregation candidate carrier but configured for inter-frequency or inter-RAT measurement, the UE does not apply the measurement gap pattern received at the aggregation candidate carrier configuration step to any downlink carrier.

Although the above embodiments are directed to the cases where the eNB notifies the UE of the measurement application priority information per RF chain or per downlink carrier explicitly, the present invention is not limited thereto. That is, the present invention can be implemented in such a way that the measurement application priority information is shared between the eNB and the UE according to an implicit rule rather than explicit signaling. For example, the measurement application priority can be determined in such a way of assigning higher (lower) measurement application priority to the RF chain for use in reception on the downlink carrier having the narrower bandwidth or the RF chain for use in reception on the downlink carrier having the band of the higher center frequency, or assigning the first priority to the RF chain for use in reception on the downlink carrier having the narrower bandwidth and, if the bandwidths are equal, assigning the second priority to the RF chain for use in reception on the downlink carrier having the lower center frequency. The present invention includes the operations of the embodiments in which the measurement application priority is determined according to other implicit rules.

FIGS. 4 to 7 are diagrams illustrating carrier management method of the UE capable of aggregating multiple downlink carriers according to an embodiment of the present invention.

Referring to FIGS. 4 to 7, the UE capable of carrier aggregation transmits the information on the UE's carrier aggregation capability to the eNB through a UE-specific message at step 401. The carrier aggregation capability information includes the information on the band available for reception/measurement per RF channel of the UE (which can be expressed as band number or center frequency information+bandwidth information). The UE's carrier aggregation capability information can be transmitted from the UE to the eNB explicitly as depicted at step 401 or transmitted from the UE to a network node such as MME. If necessary, the network node such as MME sends the UE's carrier aggregation information to the eNB.

If it is determined to apply the carrier aggregation to the UE after receiving the carrier aggregation capability information from the UE, the eNB transmits to the UE a UE-specific message including aggregation candidate downlink carrier configuration information, RF chain information per downlink carrier, and measurement gap pattern information per-RF chain priority for applying measurement gap or priority information per downlink carrier. At this time, the aggregation candidate downlink carrier configuration information includes PCC information and SCC information. The PCC (Primary Component Carrier) is the carrier responsible for the function such as the security input reference carrier for data transmission ciphering or the reference carrier for determining mobility or the primary carrier for UE-specific control information transmission as well as downlink and uplink data transmission or the reference carrier for determining radio link failure. Also, the PCC can be a specific carrier among the configured aggregation candidate carriers. The Secondary Component Carriers (SCCs) are mainly used for data transmission. Although the information on the multiple uplink carriers can be configured at step 411, the description thereon is omitted herein because it is out of the scope of the present invention.

Only the current PCC is activated at step 421 among the downlink carriers allocated to the UE receiving the UE-specific message at step 411, and all other aggregation candidate downlink carriers are in the deactivated state (hereinafter, referred to as Case_1 state). This is because the eNB notifies the UE of the candidate carrier information on the carriers to be aggregated at step 411 and thus the candidate carriers are configured but not activated yet. Since at least on downlink carrier is necessary, only the PCC indicated by the eNB at step 411 is in the activated state.

In the Case_1 state, the eNB searches for the RF chain to which the measurement gap for the deactivated downlink carriers and inter-frequency or inter-RAT measurement-configured downlink carriers in the same method as he UE at step 423. The eNB applies the measurement gap duration to the corresponding downlink carrier so as to stop performing data transmission/scheduling for the gap duration. In more detail, since the UE performs measurement on the deactivated downlink carriers or the inter-frequency or inter-RAT measurement-configured downlink carriers during the measurement gap duration, the eNB does not perform data transmission and scheduling on the downlink carrier to which the measurement gap is applied.

The eNB activates actually the downlink carriers configured at step 411 to use in data transmission or deactivates the downlink carriers to transmit the UE-specific message, if necessary, for controlling the carriers that are not used in data transmission. At this time, the UE-specific message includes the information on the target carriers to be activated or deactivated. The UE-specific message for activating or deactivating carriers may be transmitted frequently. For example, the number of activated downlink carriers and the tarts downlink carriers required due to the downlink data size or radio channel condition or cell load may change. However, although and activated specific candidate downlink carrier is deactivated, the downlink carrier may maintain the state of aggregation candidate carrier.

In the Case_1 state, the UE performs measurement to the deactivated downlink carriers and the downlink carriers that are not configured as aggregation candidate carrier but configured for inter-frequency or inter-RAT measurement. In more detail, the UE selects the RF chain having the highest (lowest) priority for reception/measurement on the corresponding downlink carrier among the RF chains having the following priorities to perform measurement.

i) priority_1: RF chain for use in reception on PCC ii) priority_2: RF chain for use in reception on downlink carrier having the highest (lowest) measurement application priority for applying the measurement gap pattern received from the eNB at step 411 among the RF chains with the exception of the RF chain for use in reception on the PCC At this time, the measurement gap pattern received from the eNB at step 411 is applied to only i) among the selected RF chains. Accordingly, the RF chain for use in reception on the PCC is used in measuring the corresponding carrier for the gap duration calculated in the time domain, or the corresponding RF chains are used in measuring the corresponding downlink carrier for the gap duration calculated in the time domain in match with the timing of the PCC applied to both the i) and ii). Here, the measurement gap information can be the measurement gap pattern type and OFFSET information and, as an example, two measurement gap patterns (application of 6 ms measurement gap of 40 ms or 6 ms measurement gap of 80 ms) can be used in the 3GPP LTE system. The start radio frame and subframe of each gap are calculated as follows.

SFN (System Frame Number) mod T=FLOOR (OFFSET/ 10)

subframe=OFFSET mod 10

SFN denotes the radio frame number indicating each radio frame. T is calculated by MGRP/10, and MGRP is set to 40 ms or 80 ms according to the type of the measurement gap. The measurement gap pattern information is of exemplary 3GPP LTE system and can be expressed with other information. The present invention includes the use of other measurement gap pattern information as well as the above measurement gap pattern (e.g. Mms gap duration in Nms can be applied).

In addition to the above embodiment, the UE is capable of selecting the RF chain for performing measurement to the downlink carrier in the course of minimizing the total number of RF chains necessary for measurement to deactivated downlink carriers and the downlink carriers that are not configured as aggregation candidate carrier but configured for inter-frequency or inter-RAT measurement. For example, it is assumed that the downlink carrier and the RF chain for use in reception on the downlink carrier are as follows. There are RF chain_1 for receiving on the primary downlink carrier_A and RF chain_2, RF chain_3, and RF chain_4 for receiving on the deactivated downlink carriers B, C, and D. The measurement application priorities are configured in the order of RF chain_2, RF chain_3, and RF chain_4.

The RF chain_1 can be used for reception/measurement on the downlink carrier_A and downlink carrier_B. The RF chain_2 can be used for reception/measurement on the downlink carrier_B and downlink carrier_C. The RF chain_3 can be used for reception/measurement on the downlink carrier_C, and the RF chain_4 can be used for reception/measurement on the downlink carrier_B, downlink carrier_C, and downlink carrier_D.

According to the rule of i) and ii), the measurement to the downlink carrier_A and downlink carrier_B are performed on the RF chain_1, and the measurement to the downlink carrier_C is performed on the RF chain_2. Also, the measurement to the downlink carrier_D is performed on the RF chain_4. In this case, the total number of required RFs is 3 that is inefficient for power saving of the UE. Thus, the UE is capable of selecting the RF chains for measurement so as to perform the measurement to the downlink carrier_A and downlink carrier_B on the RF chain_1, the measurement to the downlink carrier_C and downlink carrier_D on the RF chain_4. In this case the number of RF required for measurement is 2. In this embodiment, it is possible to use the priorities of i) and ii) along with. That is, the priorities of i) and ii) to each downlink carrier are maintained as far as the same number of RFs are required.

In the above embodiments, the PCC or measurement gap pattern is not applied to the RF chain for use in reception on the PCC in order to decrease the data transmission/reception interference on the activated PCC. The measurement is performed to only the measurement-available deactivated downlink carriers or the downlink carriers that are not configured as aggregation candidate carrier but configured for inter-frequency or inter-RAT measurement (e.g. PCC and consecutive downlink carriers on the same band). The measurement to the deactivated downlink carriers and the downlink carriers that are not configured as aggregation candidate carrier but configured for inter-frequency or inter-RAT measurement can be performed only for the other RF chains with the exception of the RF chain for used in reception on the PCC. That is, the measurement target carriers of i) can be limited to the downlink carriers PCC, deactivated downlink carrier available for measurement without application of the measurement gap pattern, and the downlink carriers that are not configured as aggregation candidate carrier but configured for inter-frequency or inter-RAT measurement. At this time, the measurement gap pattern received at aggregation candidate carrier configuration step may not be applied to both i) and ii) or may apply only to ii).

If the aggregation candidate downlink carriers, exception for the PCC, are activated or deactivated through the UE-specific message received at step 431, three states may come out as follows.

Case_1 (step 441)—state where only the PCC is activated as described with reference to step 421

Case_2 (step 443)—state where the PCC and at least one other candidate downlink carriers are activated and there is deactivated downlink carriers or downlink carriers not configured as aggregation candidate carrier but configured for inter-frequency or inter-RAT measurement (hereinafter, referred to as Case_2 state)

Case_3 (step 445)—state where the PCC and at least one other candidate downlink carriers are activated and there is no deactivated downlink carriers or downlink carriers that are not configured as aggregation candidate carrier but configured for inter-frequency or inter-RAT measurement (hereinafter, referred to as Case_3 state)

In the Case_1 state, the measurement RF chain selection and measurement gap application to the UE's deactivated downlink carriers and the downlink carriers that are not configured as aggregation candidate carrier but configured for inter-frequency or inter-RAT measurement have been described at step 421, and thus detailed description thereon is omitted herein.

In the Case_2 state, the measurement to the UE's deactivated downlink carriers and the downlink carriers that are not configured as aggregation candidate carrier but configured for inter-frequency or inter-RAT measurement is performed by selecting the RF chain having the highest (lowest) priority for reception/measurement on the corresponding downlink carrier among the RF chains of the following priorities.

i) priority_1: the RF chain for use in reception on PCC ii) priority_2: the RF chain having the highest (lowest) priority for applying the measurement gap pattern received from the eNB at step 411 or the RF chain for use in reception on the downlink carrier having the highest (lowest) measurement application priority when performing the measurement along with data transmission/reception, as the RF chains for receiving on the activated downlink carrier with the exception of the PCC among the RF chains excluding the RF chains for receiving on the PCC iii) priority_3: the RF chain having the highest (lowest) priority for applying the measurement gap pattern received at step 411 or the RF chain for use in reception on the downlink carrier having the highest (lowest) measurement application priority when perform the measurement along with the data transmission/reception among the RF chains with the exception of i) and ii)

at this time, the measurement gap pattern received form the eNB at step 411 can be applied to all of i), ii), and iii) among the selected RF chains. Accordingly, the corresponding RF chains can be used in performing measurement to the corresponding downlink during the gap duration calculated in the time domain. The measurement gap pattern also can be applied to only i) and ii). In this case, the corresponding RF chains can be used in measurement to the corresponding downlink carrier during the gap duration calculated in the time domain. Since exemplary measurement gap pattern information and gap duration calculation has been described with reference to step 421, detailed description thereon is omitted herein.

In addition to the above embodiments, the UE is capable of selecting the RF chain for performing measurement to the downlink carrier in the course of minimizing the number of RF chains required for measurement to deactivated downlink carriers and the downlink carriers that are not configured as aggregation candidate carrier but configured for inter-frequency or inter-RAT measurement in addition to the number chains used for receiving on the activated downlink carriers excluding the current PCC. Since similar examples have been described, detailed description is omitted herein. In this embodiment, it can be used along with the priorities of i), ii), and iii). That is, the priorities of i), ii), and iii) for each downlink carrier are maintained as far as the same number of additional RFs are required.

In addition to the above embodiments, the UE is capable of selecting the RF chain for performing the measurement to the downlink carriers in the course of minimizing the number of RF chains to be used in measurement to the deactivated downlink carriers and the downlink carriers that are not configured as aggregation candidate carrier but configured for inter-frequency or inter-RAT measurement, among the RF chains used in reception on the current PCC and other activated downlink carriers. For example, it is assumed that the downlink carriers and the RF chains for use in reception on the downlink carriers are as follows. First, there are RF chain_1 for receiving on the primary downlink carrier_A, RF chain_2 and RF chain_3 for receiving on the activated downlink carriers B and C, RF chain_4 and RF chain_5 for receiving on the deactivated downlink carriers D and E, and downlink carriers F and G that are not configured as aggregation candidate carrier but configured for inter-frequency or inter-RAT measurement. The measurement application priorities are configured in the order of RF chain_2, RF chain_3, RF chain_4, and RF chain_5.

The RF chain_1 is capable of being used in reception/measurement to the downlink carrier_A, downlink carrier_B, and downlink carrier_D. the RF chain_2 is capable of being used in reception/measurement to the downlink carrier_B, downlink carrier_E, and downlink carrier_F. Also, the RF chain_3 is capable of being used in reception/measurement to the downlink carrier_C, downlink carrier_D, downlink carrier_E, downlink carrier_F, and downlink carrier_G. Also, the RF chain_4 is capable of being used in reception/measurement to the downlink carrier_D. Also, the RF chain_5 is capable of being used in reception/measurement to the downlink carrier_D and downlink carrier_E.

In this case, according to the rule of i), ii), and iii), the UE performs measurement to the deactivated downlink carrier_D on the RF chain_1. The UE performs measurement to the deactivated downlink carrier_E and the downlink carrier_F that is not configured as aggregation candidate carrier but configured for inter-frequency or inter-RAT measurement on the RF chain_2. Next, the UE performs measurement to the downlink carrier_G which is configured for inter-frequency or inter-RAT measurement on the RF chain_3. In this case, since the measurement gap pattern received at the aggregation candidate carrier configuration step to all of the currently activated RF chain_1, RF chain_2, and RF chain_3, there can be significant data transmission/reception interference. Thus, the UE may select the measurement RF chain for performing all measurement to the deactivated downlink carrier_D and deactivated downlink carrier_E on the RF chain_3 and the downlink carrier_F and downlink carrier_G configured for inter-frequency or inter-RAT measurement. In this case, the measurement gap pattern received at the aggregation candidate carrier configuration state can be applied only to the RF chain_3. In the embodiment, it can be used along with the priorities of i), ii), and iii). That is, the priorities of i), ii), and iii) to each downlink carrier are maintain as far as the same number of activated RFs are required.

In the above embodiments, the PCC or the measurement gap pattern is not applied to the RF chain for use in reception on the PCC in order to reduce data communication interference on the PCC. The measurement is performed to only the deactivated downlink carriers available for measurement and the downlink carriers that are not configured as aggregation candidate carrier but configured for inter-frequency or inter-RAT measurement (e.g. PCC and consecutive downlink carrier in the same band). The measurement to the other deactivated downlink carriers and the downlink carriers that are not configured as aggregation candidate carrier but configured for inter-frequency or inter-RAT measurement can be performed on the RF chains with the exception of the RF chain for use in reception on the PCC. Here, the measurement target carriers of i) are limited to the PCC, the deactivated downlink carrier available for measurement without application of the measurement gap pattern (without interference of the gap application to the reception on the PCC), and the downlink carriers that are not configured as aggregation candidate carrier but configured for inter-frequency or inter-RAT measurement. At this time, the measurement gap pattern received at the aggregation candidate configuration step may not be applied to i).

In the Case_3 state (455), the UE stops applying the measurement gap pattern received at step 411.

The eNB searches for the RF chain to perform the measurement to the deactivated downlink carriers and the downlink carriers that are not configured as aggregation candidate carrier but configured for inter-frequency or inter-RAT measurement in the same method as the UE in adaptation to the current Case of the UE. Next, the eNB calculates the measurement gap duration and does not perform data transmission/scheduling for the gap duration. Since the UE performs measurement to the deactivated downlink carrier and the downlink carriers that are not configured as aggregation candidate carrier but configured for inter-frequency or inter-RAT measurement, the eNB does not perform data transmission or scheduling on the downlink to which the measurement gap is applied.

Figure 4:
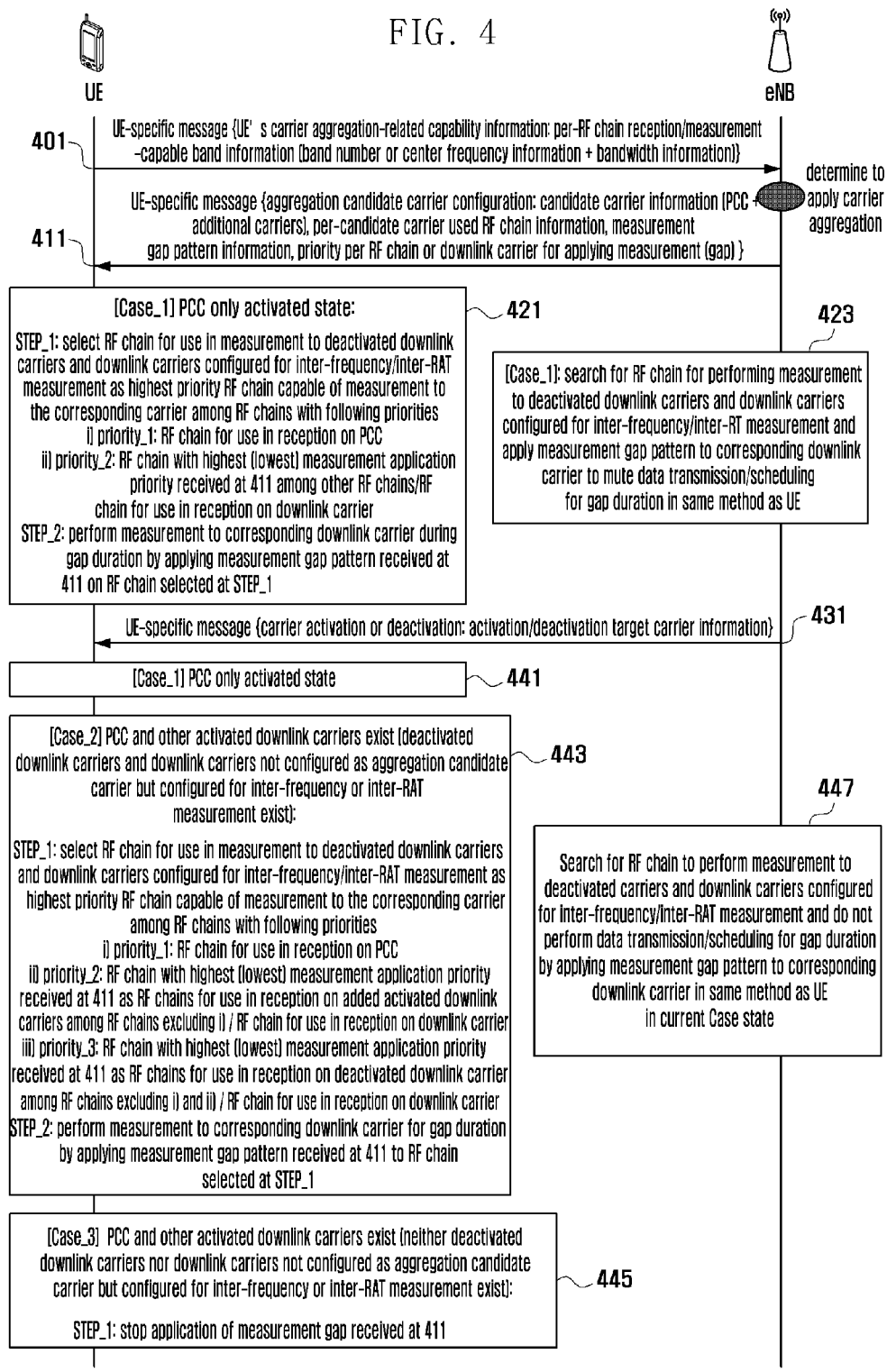
FIGS. 4 to 7 are diagrams illustrating carrier management method of the UE capable of aggregating multiple downlink carriers according to an embodiment of the present invention.

Although the description is directed to an exemplary case where the eNB notifies the UE of the measurement application priority information per RF chain or downlink carrier explicitly at step 441 of FIG. 4, the present invention is not limited thereto. That is, rather than the explicit notification, the measurement application priority can be shared between the eNB and the UE according to an explicit rule. For example, the measurement application priority can be determined in such a way of assigning higher (lower) measurement application priority to the RF chain for use in reception on the downlink carrier having the narrower bandwidth or the RF chain for use in reception on the downlink carrier having the band of the higher center frequency, or assigning the first priority to the RF chain for use in reception on the downlink carrier having the narrower bandwidth and, if the bandwidths are equal, assigning the second priority to the RF chain for use in reception on the downlink carrier having the lower center frequency. The present invention includes the operations of the embodiments in which the measurement application priority is determined according to other implicit rules.

The measurement gap pattern information received at step 411 of FIG. 4 is the information stored by the UE before the receipt of the notification of the release of the measurement gap pattern information through a separate UE-specific message. However, whether to apply or not the measurement gap pattern information received at step 411 can be determined at the UE automatically according to Case_1 441 Case_2 443, and Case_3 445.

Figure 5:
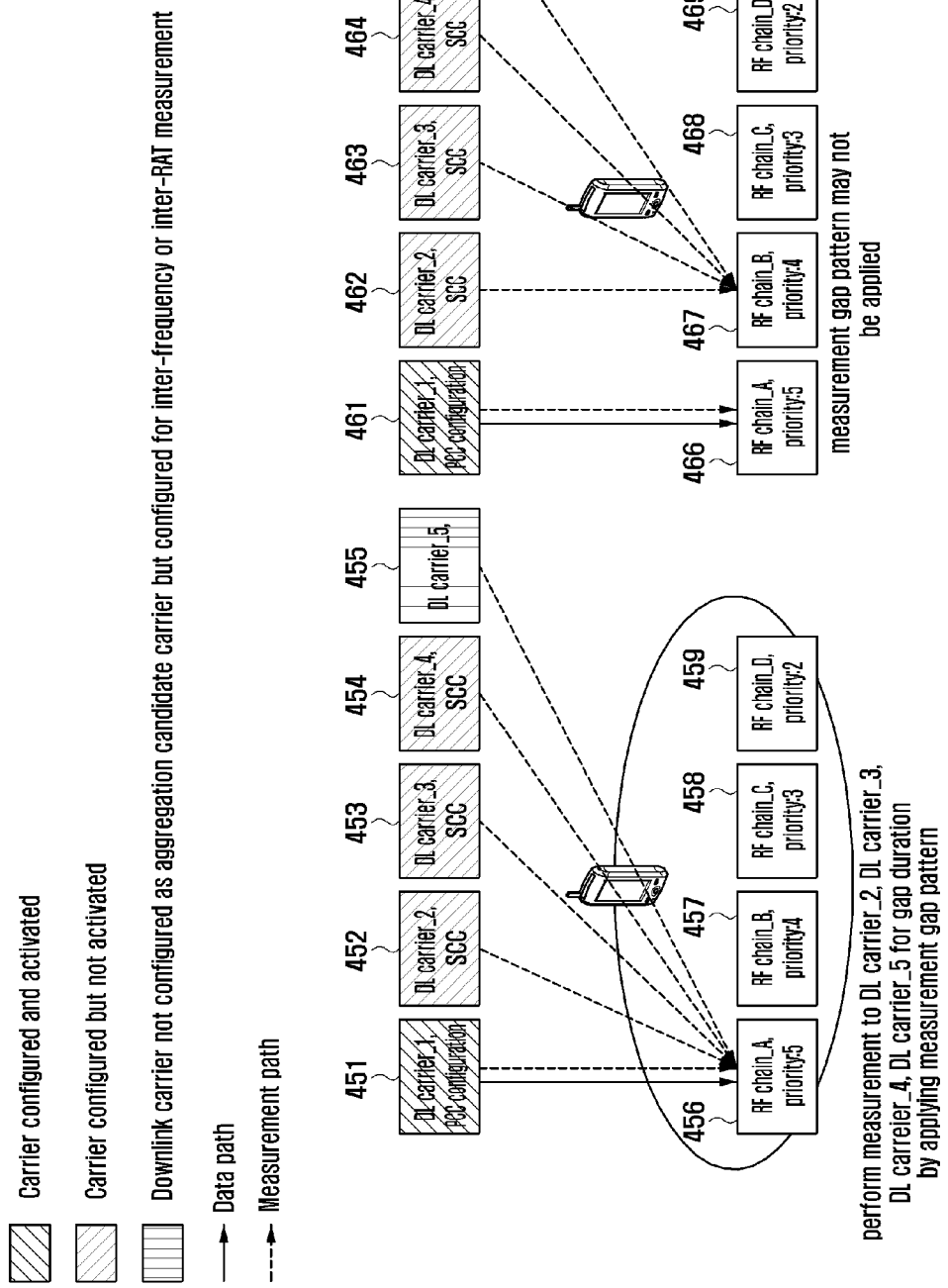
Figure 6:
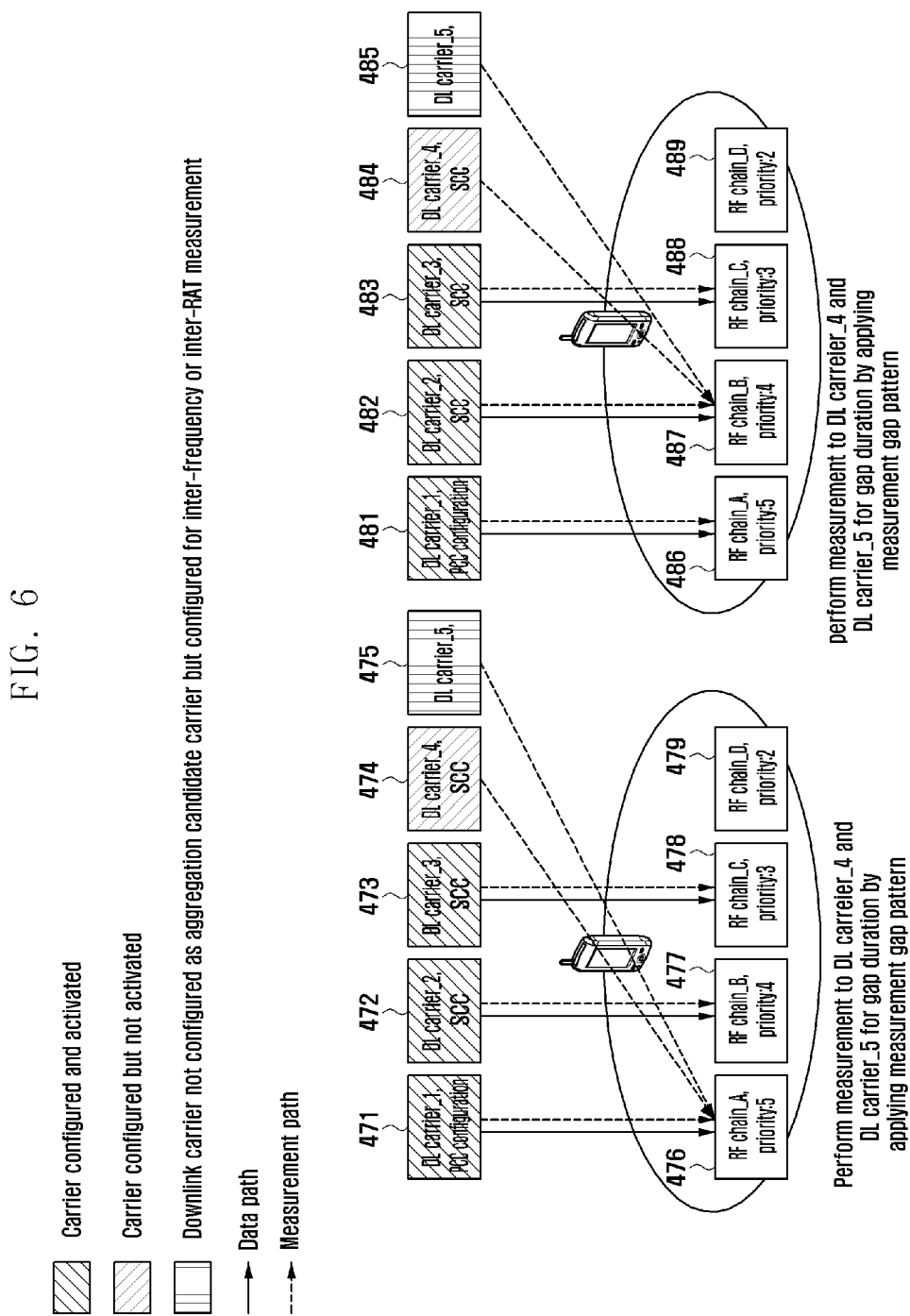
Figure 7:
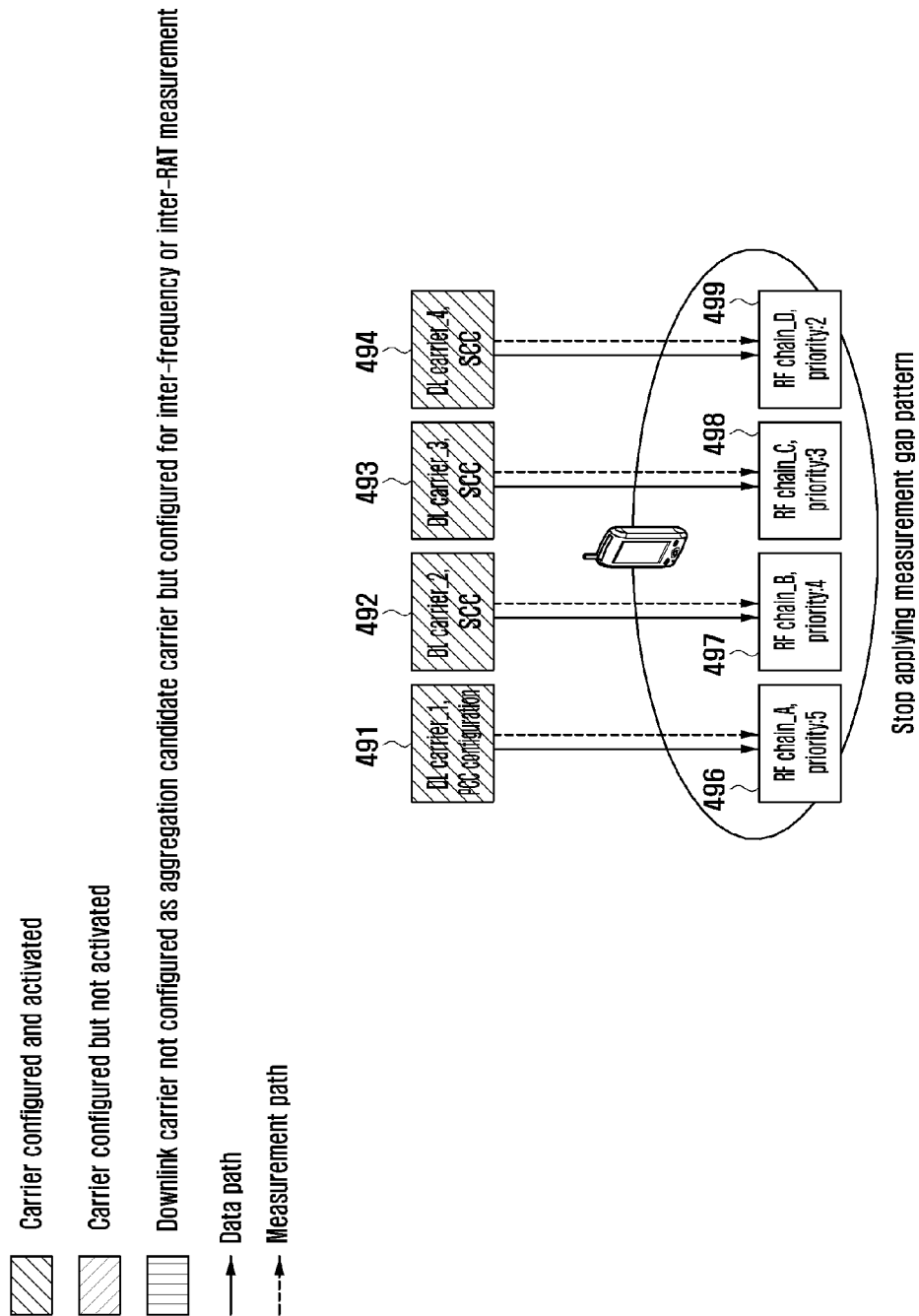

Reference numbers 451 to 499 in FIGS. 5 to 7 show the exemplary cases of the mapping paths of the RF chains for performing measurement to the aggregation candidate downlink carriers and the downlink carriers that are not configured as aggregation candidate carrier but configured for inter-frequency or inter-RAT measurement and, at this time, whether the measurement gap pattern received at the aggregation candidate carriers configuration step is applied, under a predetermined assumption.

Reference numbers 451 to 499 in FIGS. 5 to 7 denote the 4 RF chains currently configured for downlink carrier aggregation for the UE (RF chain_A, RF chain_B, RF chain_C, and RF chain_D). At the aggregation candidate carrier configuration step, DL carrier_1, DL carrier_2, DL carrier_3, and DL carrier_4 are configured as the aggregation candidate downlink carriers. Here, it is assumed that the DL carrier_1 is configured as PCC and for reception in use of RF chain_A, DL carrier_2 for reception in use of RF chain_B, DL carrier_3 for reception in use of RF chain_C, and DL carrier_4 in use of RF chain_D.

The DL carrier_5 is the downlink carrier that is not configured as aggregation candidate carrier but configured for inter-frequency or inter-RAT measurement. It is assumed that each RF chain is available for the reception/measurement on all of the DL carrier_1, DL carrier_2, DL carrier_3, DL carrier_4, and DL carrier_5. However, it is assumed that the reception/measurement to multiple carriers is impossible.

Reference numbers 451 to 459 in FIG. 5 denotes the RF chains for use in measurement of the UE in the Case_1 state. It is possible to perform measurement to the corresponding downlink carriers according to an embodiment of the present invention. The measurement to DL carrier_2, DL carrier_3, and DL carrier-4 as deactivated downlink carriers, and the DL carrier_5 which is not configured as aggregation candidate carrier but configured for inter-frequency or inter-RAT measurement is performed in the RF chain_A for use in reception on PCC. The UE performs measurement to the downlink carriers with the application of the measurement gap pattern received at the aggregation carrier configuration step during the gap duration.

Since the RF chain for use in reception on the DL carrier_1 is the RF chain_A, the measurement to the DL carrier_1 can be performed in parallel with the data reception without application of the measurement gap. At this time, the RF chain_B, RF chain_C, and RF chain_D are disabled, resulting in power saving.

Reference numbers 461 to 469 in FIG. 5 denote the RF chain in use for measurement of the UE according to an embodiment of the present invention in the course of minimizing the data and control information transmission/reception interference on the PCC activated in the Case_1 state (i.e. measurement gap pattern is not applied to the PCC). The UE uses the DL carrier_1 as the PCC on the RF chain_A for receiving data and control information and performs measurement to the DL carrier_1. The measurement to the DL carrier_1 can be performed in parallel with the reception of the data and control information without application of the measurement gap since the RF chain for use in reception on the DL carrier_1 is the RF chain_A.

Here, the measurement to the DL carrier_2, DL carrier_3, and DL carrier_4 as the deactivated downlink carriers, and the DL carrier_5 as the downlink carrier which is not configured as aggregation candidate carrier but configured for inter-frequency or inter-RAT measurement is performed on the corresponding downlink carriers among the other RF chains than the RF chain_A for use in reception on the PCC (in order not to apply the measurement gap to the PCC). Accordingly, the measurement is performed on the RF chain_B having the highest measurement application priority received at the carrier aggregation configuration step. Since the RF chain_B is of being used in reception on the deactivated DL carrier_2 regardless on the reception of data and control information, it may be stopped to apply the measurement gap pattern received at the carrier aggregation configuration step. The present invention does not rule out the method for measuring the corresponding downlink carriers with the application of the measurement gap to the RF chain_B.

Reference numbers 471 to 479 of FIG. 6 denote the RF chains for use in measurement of the UE in the Case_2 state. According to an embodiment of the present invention, it is possible to perform measurement to the corresponding downlink carriers. In more detail, the measurement to the DL carrier_4 as the deactivated downlink carrier and the DL carrier_as the downlink carrier which is not configured as aggregation candidate carrier but configured for inter-frequency or inter-RAT measurement can be performed on the RF chain_A for use in reception on the PCC. That is, the measurement to the downlink carriers is performed by applying the measurement gap pattern received at the carrier aggregation configuration step only during the gap duration. The DL carrier_1 as PCC and DL carrier_2 and DL carrier_3 as activated downlink carriers can be measured in parallel with the reception of data and control information on the respective RF chain_A, RF chain_B, and RF chain_C. At this time, the RF chain_D is disabled to save power.

Reference number 481 to 489 of FIG. 6 denotes the RF chains for use in measurement of the UE according to an embodiment of the present invention the course of minimizing the data and control information transmission/reception interference on the PCC activated in the Case_2 state (i.e. the measurement gap pattern is not applied to the PCC). The measurement to the DL carrier_1 as the PCC, and the DL carrier_2 and DL carrier_3 as the activated downlink carriers are performed in parallel with reception of data and control information on the corresponding RF chains of RF chain_A, RF chain_B, and RF chain_C without application of the measurement gap. The measurement to the DL carrier_4 as the deactivated downlink carrier and the DL carrier_5 as the downlink carrier which is not configured as aggregation candidate carrier but configured for inter-frequency or inter- RAT measurement is performed to the corresponding downlink carriers among the RF chains for use in reception on the activated downlink carriers other than the RF chain_A for use in reception on the PCC (in order not to apply the measurement gap to the PCC). That is, the measurement is performed on the RF chain_B having the highest measurement application priority received at the carrier aggregation configuration step. The measurement to the DL carrier_4 and DL carrier_5 is performed only during the gap duration with the application to the measurement gap pattern received at the carrier aggregation configuration step.

Reference numbers 491 to 499 of FIG. 7 denote the RF chains for use in measurement of the UE in the Case_3 state. It is assumed that the carrier (DL carrier-5) which is not configured as aggregation candidate carrier but configured for inter-frequency or inter-RAT measurement does not exist in association with reference numbers 491 to 499. According to an embodiment of the present invention, the DL carrier_1, DL carrier_2, DL carrier_3, and DL carrier_4 are measured without application of the measurement gap in parallel with the reception of data are control information on the corresponding RF chains of RF chain_A, RF chain_B, RF chain_C, and RF chain_D. At this time, the measurement gap pattern information received at the carrier aggregation configuration step is not applied.

The description has been directed to the case where measurement gap pattern application priority per RF or measurement priority information per downlink carrier and the measurement gap pattern information are signaled through the carrier aggregation configuration message and thus the measurement is performed based on the Case state selected according to the activation/deactivation of the candidate downlink carrier. That is, when the measurement gap pattern information is signaled through the carrier aggregation configuration message, the RF chain to which the measurement gap is applied is selected and then the measurement is performed. Alternatively, the UE is capable of performing measurement to the downlink carriers using the information included in the command message indicating activation/deactivation of the candidate downlink carriers which is received from the eNB. That is, the UE is capable of determining whether the command message received form the eNB with the indication on the activation/deactivation of the candidate downlink carriers includes the information on the RF chain or downlink carrier to which the measurement gap is applied and applying the measurement gap pattern to the corresponding RF chains.

Figure 8:
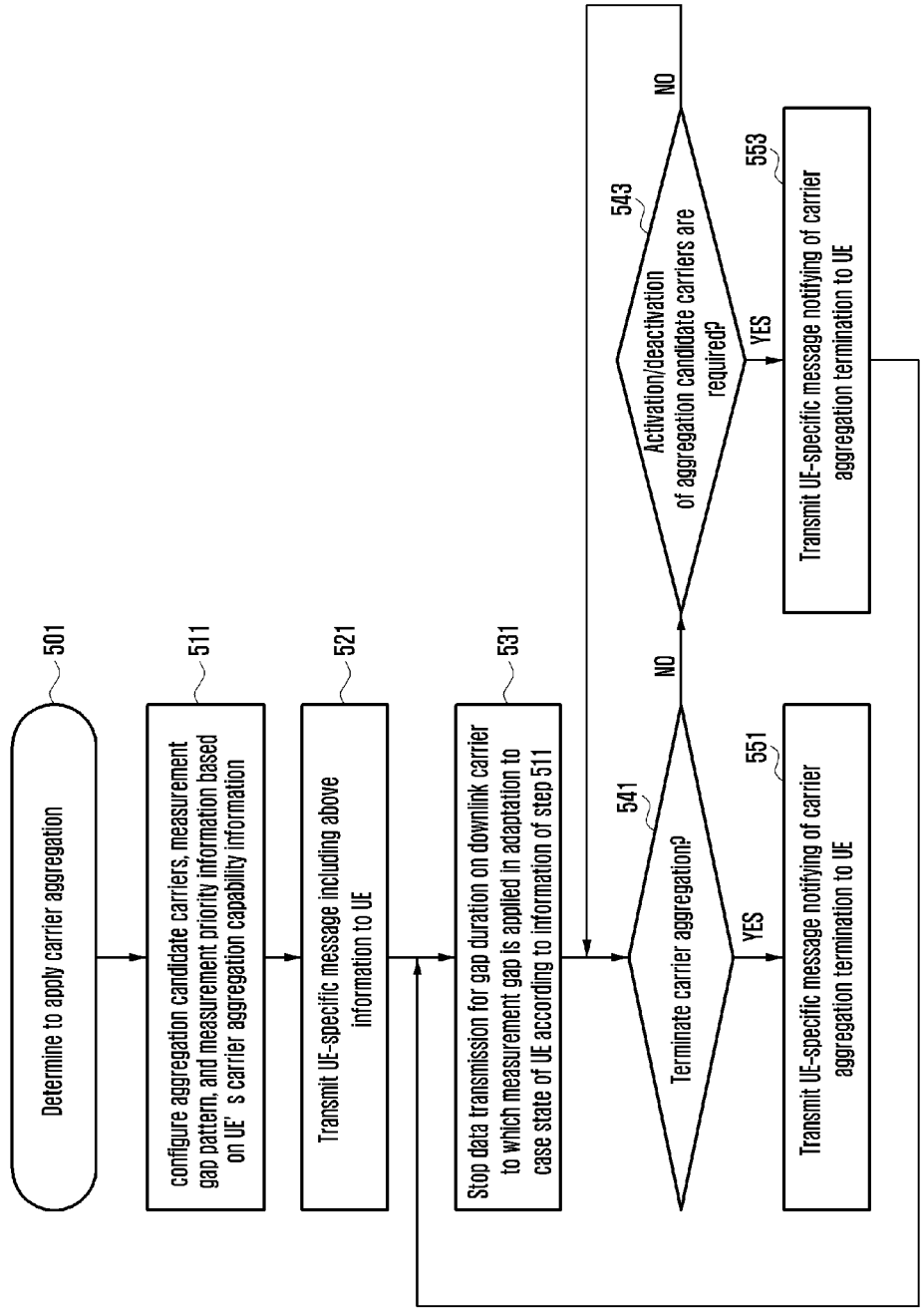
FIG. 8 is a flowchart illustrating the operation of the eNB capable of carrier aggregation according to an embodiment of the present invention.

FIG. 8 is a flowchart illustrating the operation of the eNB capable of carrier aggregation according to an embodiment of the present invention.

Referring to FIG. 8, if it is determined to apply carrier aggregation to a specific UE at step 501, the UE configures the aggregation candidate downlink/uplink carriers, measurement gap pattern, measurement gap application priority per RF chain or per downlink carrier, etc. based on the UE carrier aggregation capability information received from the UE or the MME, at step 511. Here, the aggregation candidate downlink carrier information includes the PCC information and SCCs information. The per-downlink carrier information includes the information on the center frequency band, bandwidth, and RF chain for use in reception on the downlink carrier. The measurement gap pattern information includes the type of the measurement gap pattern and OFFSET. The measurement priority information per RF channel or downlink carrier to which the measurement gap is applied incudes the mapping list of RF chain and measurement gap application priority or the mapping list of downlink carrier and measurement gap application priority. The eNB transmits a UE specific message including the information configured at step 511 to the UE at step 521.

Next, the eNB determines the Case based on whether the PCC configured for carrier aggregation to the UE and other downlink, activation/deactivation of other downlink carriers, and whether there is the downlink carriers that are not configured as aggregation candidate carrier but configured for inter-frequency or inter-RAT measurement at step 531. The UE selects the RF chain or downlink carrier to which the measurement gap is applied as defined per Case. The eNB applies the measurement gap pattern determined at step 511 to the selected carrier in the same method as the UE to stop data transmission and scheduling during the gap duration. Here, the Case determination is performed in the same method as used in the UE described with reference to FIG. 4. Since the method for determining Case, selecting RF chain or downlink carrier for applying the measurement gap as defined per Case, and utilizing the measurement gap pattern information has been described with reference to FIG. 4 already, detailed description thereon with reference to FIG. 8 is omitted. Next, the eNB determines whether the carrier aggregation is to be terminated at step 541. If it is determined to terminate the carrier aggregation to the UE, the eNB transmits a UE-specific message including carrier aggregation termination information to the UE at step 551. Otherwise, if it is determined not to terminate the carrier aggregation, the eNB determines whether it is necessary to perform activation/deactivation of predetermined aggregation candidate downlink carriers at step 543.

If it is necessary to perform activation/deactivation of predetermined aggregation candidate downlink carriers, the eNB transmits a UE-specific message including the activation/deactivation indication information per downlink carrier to the UE at step 553. Next, the eNB returns the procedure to step 531 since the downlink carrier activation/deactivation command may change the Case state of the UE.

Figure 9:
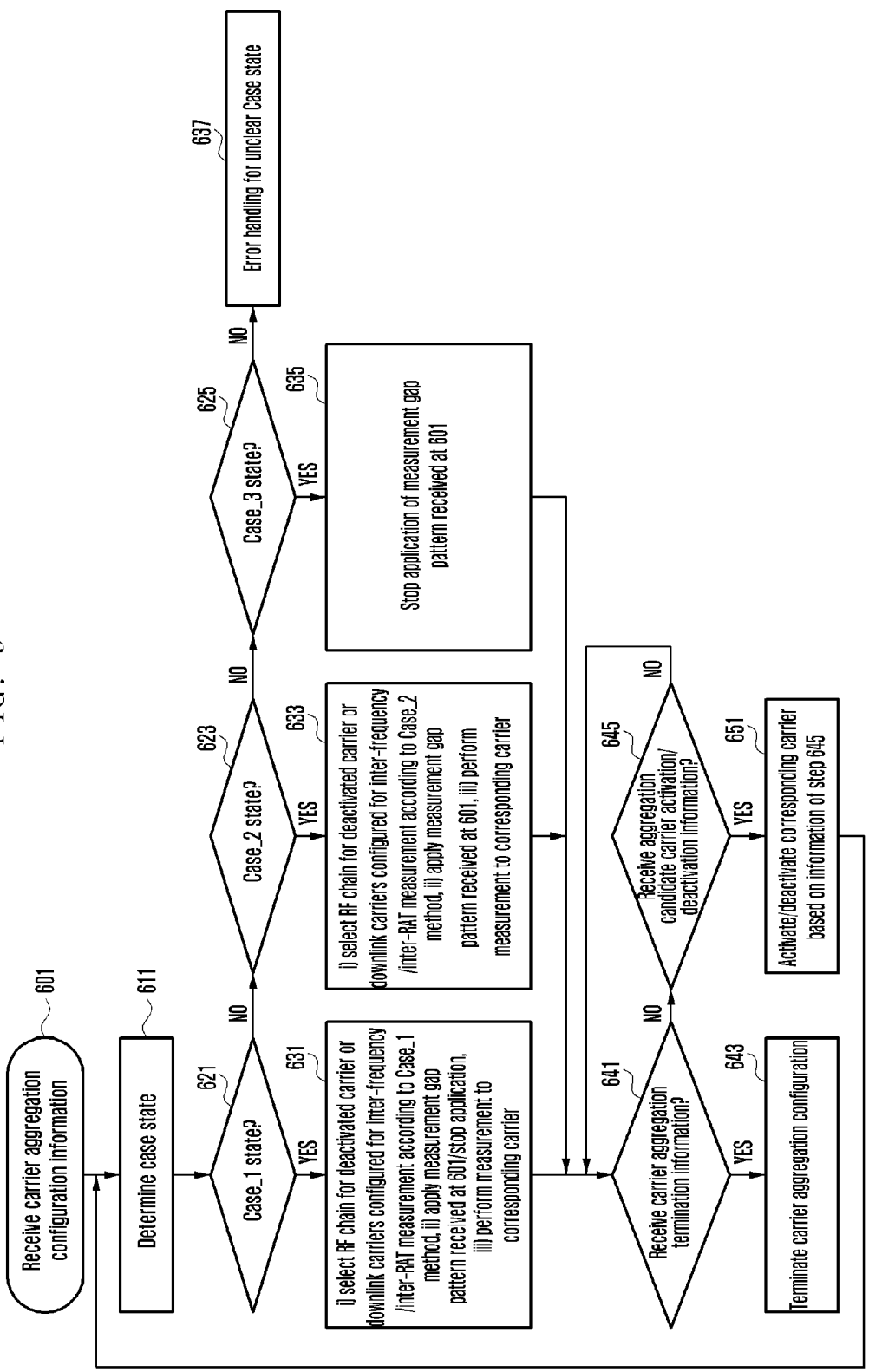
FIG. 9 is a flowchart illustrating the operation of the UE capable of carrier aggregation according to an embodiment of the present invention.

FIG. 9 is a flowchart illustrating the operation of the UE capable of carrier aggregation according to an embodiment of the present invention.

Referring to FIG. 9, if the carrier aggregation configuration information is received from the eNB at step 601, the UE capable of carrier aggregation determines the Case state according to whether the PCC and other downlink carriers exist at step 611. That is, the UE determines the Case state based on whether the PCC and other downlink carriers are activated/deactivated and whether the downlink carriers are the carriers not configured as aggregation candidate carrier but configured for inter-frequency or inter-RAT measurement. At this time, the carrier aggregation configuration information may include the aggregation candidate downlink/uplink carrier information, measurement gap pattern information, and measurement priority information per RF channel or per downlink carrier for applying the measurement gap. The aggregation candidate downlink carrier information includes PCC information and SCCs information. The each downlink carrier information includes center frequency band information, bandwidth information, and RF chain information for reception in the downlink carrier. The measurement gap pattern information includes the measurement gap pattern type information and OFFSET information. The measurement priority information per RF channel or per downlink carrier for applying the measurement gap includes a mapping list of the RF chain and measurement gap application priority or a mapping list of the downlink carrier and the measurement gap application priority. The Case state determination method at step 611 is performed in the same method as the UE which has been described with reference to FIG. 4.

If the case state is determined as Case_1 state at step 621, the UE selects the RF chain or downlink carrier to which the measurement gap patter is applied for performing measurement to the deactivated downlink carriers and the downlink carriers that are not configured as aggregation candidate carrier but configured for inter-frequency or inter-RAT measurement, at step 631, as described with reference to FIG. 4. Since how to select the RF chain or downlink carrier to which the measurement gap is applied as defined for the Case_1 has been described with reference to FIG. 4, detailed description thereon is omitted in association with FIG. 9.

If an RF chain or downlink carrier is selected, the UE is capable of perform measurement to the deactivated downlink carriers and the downlink carriers that are not configured as aggregation candidate carrier but configured for inter-frequency or inter-RAT measurement during the measurement gap duration by applying RF chain selected at step 631 and the measurement gap pattern received at step 601 to the downlink carriers. Here, how to calculate the gap duration using the measurement gap pattern information and the embodiments of applying the measurement gap received at step 601 or not have been described with reference to FIG. 4, detailed description thereon is omitted herein.

The UE is also capable of performing the measurement to the downlink carriers at step 631 without applying the measurement gap pattern received at step 60. Since the embodiment for applying the measurement gap pattern and the embodiment for not applying the measurement gap pattern have been described with reference to FIG. 4, detailed description thereon is omitted herein.

If the case state is determined as Case_2 state at step 623, the UE is capable of performing the measurement, at step 633, to the deactivated downlink carriers and the downlink carriers that are not configured as aggregation candidate carrier but configured for inter-frequency or inter-RAT measurement according to the method corresponding to the Case_2 state as described with reference to FIG. 4. For this purpose, the UE selects the RF chain to which the measurement gap pattern is to be applied or the RF chain for use in reception on the downlink carrier. How to select the RF chain or downlink carrier to which the measurement gap is applied according to the method defined for the Case_2 has been described with reference to FIG. 4, detailed description thereon is omitted herein.

Once the RF chain or the downlink carrier has been selected, the UE applies the measurement gap pattern received at step 601 to the selected RF chain or downlink carrier as proposed at step 633. Next, the UE performs the measurement to the deactivated carriers and the downlink carriers that are not configured as aggregation candidate carrier but configured for inter-frequency or inter-RAT measurement during the measurement gap duration. The measurement gap pattern information-based gap duration calculation method has been described with reference to FIG. 4, detailed description thereon is omitted herein.

If the case state is determined as Case_3 at step 625, the UE stops, at step 635, applying the measurement gap pattern received at step 601. If the case state is not any of Case_1, Case_2, and Case_3 states, the UE performs error handling for unclear Case state at step 637.

If the information triggering termination of the carrier aggregation operation for the UE is received from the eNB at step 641, the UE stops carrier aggregation configuration, releases the configured aggregation candidate downlink carriers, and withdraws the resources of the downlink carriers at step 643. However, if the information triggering activation or deactivation of specific aggregation candidate downlink carriers is received from the eNB at step 645, the UE activates or deactivates the carriers at step 651 as indicated in information received at step 645. Since the activation/deactivation of the candidate downlink carriers at step 645 may change the Case state of the UE, the UE performs steps 611 to 637 again to determine the Case state and perform measurement according to the Case state.

Hereinabove, the description has been directed to the procedure for selecting, when the measurement gap pattern information is received in the carrier aggregation configuration message, the RF chain to which the measurement gap is to be applied and performing the measurement according to the selection result. Alternatively, the downlink carrier measurement can be performed using the information included in the command message transmitted by the eNB to notify of the activation/deactivation of candidate downlink carriers. That is, the UE is capable of determining whether the command message transmitted by the eNB to notify the activation/deactivation of candidate downlink carriers includes the information on the RF chain or downlink carrier to which the measurement gap is to be applied and applying the measurement gap pattern to the corresponding RF chain.

Figure 10:
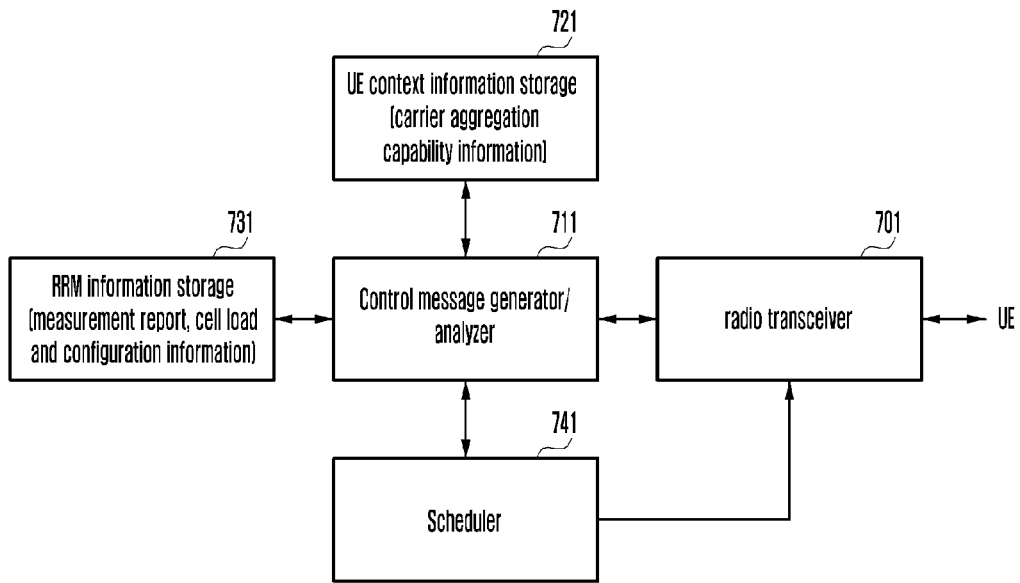
FIG. 10 is a block diagram illustrating a configuration of the eNB according to an embodiment of the present invention.

FIG. 10 is a block diagram illustrating a configuration of the eNB according to an embodiment of the present invention.

Referring to FIG. 10, the eNB includes a radio transceiver 701, a control message generator/analyzer 711, a UE context information storage 721, an RRM information storage 731, and a scheduler.

The radio transceiver 701 is responsible for radio communication with UEs.

The control message generator/analyzer 711 is responsible for generating control message to be transmitted to the UE and analyzing the control message received from the UE. Here, the control message generator/analyzer 711 transmits to the UE the carrier aggregation candidate configuration information, measurement gap pattern information, measurement priority information per RF chain or downlink carrier to which the measurement gap pattern is to be applied, etc. The control message generator/analyzer 711 also is responsible for instructing the UE to activate/deactivate specific candidate downlink carriers.

The UE context information storage 721 stores the information on the UE which includes carrier aggregation capability information.

The RRM (Radio Resource Management) information storage 731 stores the measurement report information transmitted by the UE, cell configuration information, load information of the cell, etc. The UE context information and RRM information are referenced when configuring the carrier aggregation information and activating/deactivating specific candidate carriers.

The scheduler 741 configures the scheduling information for UE's data transmission/reception and transmit/receive data of the corresponding UE through the scheduled time-frequency resource. If a measurement gap pattern is applied to specific RF chain or downlink carrier, the scheduler 741 does not schedule data transmission/reception for the corresponding UE during the measurement gap duration on the corresponding downlink carrier.

Figure 11:
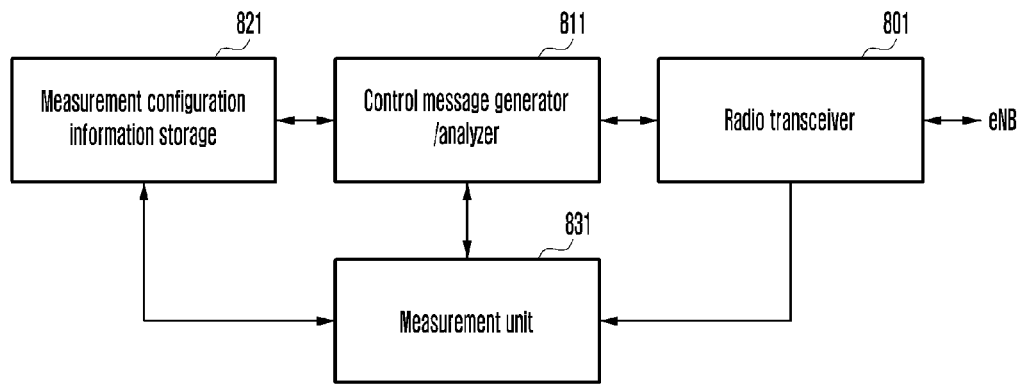
FIG. 11 is a block diagram illustrating a configuration of the UE according to an embodiment of the present invention.

FIG. 11 is a block diagram illustrating a configuration of the UE according to an embodiment of the present invention.

Referring to FIG. 11, the UE includes a radio transceiver 801, a control message generator/analyzer 811, a measurement configuration information storage 821, and a measurement unit 831.

The radio transceiver 801 is responsible for radio communication with the eNB and capable of configuring plural RF chains.

The control message generator/analyzer 811 is responsible for generating control messages to be transmitted to the eNB and analyzing the control messages received from the eNB. Here, the control message generator/analyzer 811 is capable of receiving the carrier aggregation candidate configuration information, measurement gap pattern information, and measurement gap application priority information per RF chain or downlink carrier to which the measurement gap pattern is to be applied. The control message generator/analyzer 811 also receives the activation/deactivation command for specific candidate downlink carriers and the inter-frequency or inter-RAT measurement configuration information.

The measurement configuration information storage 821 stores the configuration information related to the intra-frequency/inter-frequency/inter-RAT of the UE.

The measurement unit 831 performs intra-frequency/inter-frequency/inter-RAT measurement. In more detail, the measurement unit 831 performs, when the measurement gap pattern is applied, measurement to the deactivated downlink carriers and the downlink carriers that are not configured as aggregation candidate carrier but configured for inter-frequency or inter-RAT measurement during the corresponding gap duration of the corresponding downlink carrier.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A carrier measurement method of a terminal, the method comprising:
    receiving, from a base station, priority information on a plurality of RF chains for a measurement of downlink carriers, wherein the priority information is specific to the terminal, and each of the plurality of RF chains is used for reception on one or more downlink carriers;
    determining a connection state of the terminal, wherein the connection state is one of a state that a primary downlink carrier is activated or a state that the primary downlink carrier and at least one secondary downlink carrier for carrier aggregation is activated;
    selecting at least one RF chain which a measurement gap is applied to among the plurality of RF chains according to the connection state and the received priority information by minimizing a number of the at least one RF chain to be used to measure the downlink carriers; and
    during the measurement gap, measuring the downlink carriers by using the selected at least one RF chain.

2. The carrier measurement method of claim 1, wherein selecting comprises
    selecting an RF chain for use in reception on the primary downlink carrier; and
    selecting the at least one RF chain according to the priority information.

3. The carrier measurement method of claim 1, wherein measuring of the downlink carriers comprises
    measuring the primary downlink carrier, at least one measurement-capable deactivated secondary downlink carrier, and downlink carriers configured for a measurement using the RF chain for use in reception on the primary downlink carrier.

4. A carrier measurement method of a mobile communication system including a base station and a terminal, the method comprising:
    transmitting, at the base station, a terminal-specific message including measurement gap pattern information and priority information on a plurality of RF chains for a measurement of one or more downlink carriers and muting at least one of data transmission and data scheduling to the terminal during a gap duration indicated in the measurement gap pattern information;
    determining, at the terminal, a connection state of the terminal, wherein the connection state is one of a state that a primary downlink carrier is activated or a state that the primary downlink carrier and at least one secondary downlink carrier for carrier aggregation is activated;
    selecting at least one RF chain among the plurality of RF chains according to the connection state and the priority information by minimizing a number of the at least one RF chain to be used to measure the downlink carriers;
    applying the measurement gap pattern to the selected at least one RF chain; and
    during a measurement gap, measuring the downlink carriers during the gap duration indicated in the measurement gap pattern information.

5. The carrier measurement method of claim 4, wherein the terminal-specific message comprises at least one of activation target downlink carrier information and deactivation target downlink carrier information.

6. A carrier measurement terminal comprising:
    a radio transceiver for communicating with a base station and configuring a plurality of RF chains, wherein each of the plurality of RF chains is used for reception on one or more downlink carriers;
    a control message module configured to control the radio transceiver to receive carrier aggregation candidate configuration information, measurement gap pattern information, priority information on a plurality of RF chains, one of an activation command and a deactivation command for specific candidate downlink carriers, and one of inter-frequency measurement configuration information and inter-system measurement configuration information;
    a measurement module configured to:
        determine a connection state of the terminal, wherein the connection state is one of a state that a primary downlink carrier is activated or a state that the primary downlink carrier and at least one secondary downlink carrier for carrier aggregation are activated,
        select at least one RF chain which a measurement gap pattern is applied to among the plurality of RF chains according to the connection state and the received priority information by minimizing a number of the at least one RF chain to be used to measure the downlink carriers, and
        measure, via the radio transceiver, the downlink carriers based on the measurement gap pattern information during a measurement gap by using the selected at least one RF chain.

7. The carrier measurement terminal of claim 6, wherein the measurement module is further configured to:
- select an RF chain for use in reception on the primary downlink carrier, and
- select the at least one RF chain according to the priority information.

8. The carrier measurement terminal of claim 6, wherein the measurement module is further configured to measure the primary downlink carrier, at least one measurement-capable deactivated secondary downlink carrier, and downlink carriers configured for a measurement using the RF chain for use in reception on the primary downlink carrier.

\* \* \* \* \*